United States Patent
Bang et al.

(10) Patent No.: US 8,965,729 B2
(45) Date of Patent: Feb. 24, 2015

(54) APPARATUS AND METHOD FOR RECOGNIZING MOTION

(75) Inventors: Won-chul Bang, Seongnam-si (KR); Seong-il Cho, Seoul (KR); Byung-seok Soh, Hwaseong-si (KR); Eun-seok Choi, Anyang-si (KR); Sung-jung Cho, Seoul (KR); Yeun-bae Kim, Seongnam-si (KR); Kyu-yong Kim, Yongin-si (KR); Sang-on Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 294 days.

(21) Appl. No.: 12/076,015

(22) Filed: Mar. 12, 2008

(65) Prior Publication Data

US 2009/0070060 A1  Mar. 12, 2009

(30) Foreign Application Priority Data

Sep. 11, 2007  (KR) ................... 10-2007-0092224

(51) Int. Cl.
| | |
|---|---|
| *G01P 15/00* | (2006.01) |
| *G06F 3/03* | (2006.01) |
| *G06F 3/0346* | (2013.01) |
| *G06F 3/0354* | (2013.01) |
| *G06F 3/0488* | (2013.01) |
| *G06K 9/22* | (2006.01) |

(52) U.S. Cl.
CPC ............ *G06F 3/0317* (2013.01); *G06F 3/0346* (2013.01); *G06F 3/03545* (2013.01); *G06F 3/04883* (2013.01); *G06K 9/224* (2013.01)
USPC ........................................ 702/141

(58) Field of Classification Search
USPC .................. 702/141, 96; 345/156, 8, 179; 340/407.2
See application file for complete search history.

(56) References Cited

U.S. PATENT DOCUMENTS

| | | | |
|---|---|---|---|
| 6,498,604 B1 * | 12/2002 | Jensen ........................ 345/179 |
| 2008/0048931 A1 * | 2/2008 | Ben-Ari ........................ 345/8 |
| 2008/0120056 A1 * | 5/2008 | Haino et al. .................... 702/96 |
| 2008/0284726 A1 * | 11/2008 | Boillot .......................... 345/156 |
| 2009/0289779 A1 * | 11/2009 | Braun et al. ................ 340/407.2 |

FOREIGN PATENT DOCUMENTS

| | | |
|---|---|---|
| JP | 11-85387 | 7/1989 |
| JP | 05-088809 | 4/1993 |
| KR | 10-2002-0080171 | 10/2002 |
| KR | 10-0360477 | 10/2002 |
| KR | 10-2007-0042858 | 4/2007 |

OTHER PUBLICATIONS

Korean Office Action issued Sep. 30, 2013 in corresponding Korean Patent Application No. 10-2007-0092224.

* cited by examiner

*Primary Examiner* — Tung S Lau
*Assistant Examiner* — Xiuquin Sun
(74) *Attorney, Agent, or Firm* — Staas & Halsey LLP

(57) ABSTRACT

Provided is an apparatus and method of recognizing a motion that is capable of performing a pointing function and a character input function using motions sensed by an optical sensor and an inertial sensor. The apparatus includes an inertial sensor sensing a first motion by using at least one of acceleration and angular velocity that are generated by an input motion; an optical sensor sensing a second motion by using reflection of light due to the motion; a locus calculating unit calculating the locus of the motion on the basis of the locus of the first motion and the locus of the second motion; and a communication unit transmitting the calculated locus of the motion.

44 Claims, 11 Drawing Sheets

APPARATUS AND METHOD FOR RECOGNIZING MOTION

CROSS REFERENCE TO RELATED APPLICATION

This application claims priority from Korean Patent Application No. 10-2007-0092224 filed on Sep. 11, 2007 in the Korean Intellectual Property Office, the disclosure of which is incorporated herein by reference in its entirety.

BACKGROUND OF THE INVENTION

1. Field of the Invention

The present invention relates to an apparatus and method of recognizing a motion, and more particularly, to an apparatus and method of recognizing a motion that is capable of performing a pointing function and a character input function using motions sensed by an optical sensor and an inertial sensor.

2. Description of the Related Art

In recent years, a technique for connecting a memory device storing, for example, pictures, music, and moving pictures to a television has been proposed to enable a user to view multimedia contents on a TV screen. In addition, an IPTV (Internet protocol television) has been developed to provide various Internet-based services and contents as well as the existing broadcasting channels to the user. Therefore, there is an increasing necessity for the use of a keyboard and a mouse, which are input units used for a personal computer (PC). For this reason, an air mouse, which is a pointing apparatus using a gyro, has come into widespread use for various apparatuses, such as a PC and a TV.

However, in order to search contents or a web page on the IPTV, a character input unit is necessarily needed. The character input unit is formed by a combination of a remote controller and a keyboard, a combination of a keypad for a mobile phone and a remote controller, or a combination of a keyboard displayed on the screen and an air mouse. The following methods can be used to input characters to a PC, not a TV: a method of forming an optical mouse into a pen shape and converting the locus of a motion on a writing pad into a character; a method of using the absolute position of a pen that moves on a special pad; and a method of recognizing the motion of a pen using ultrasonic waves and infrared rays.

When a keyboard is additionally provided in order to input characters, this structure is not suitable for a living room environment, and may hinder the posture of the user using the keyboard and user's convenient viewing. When buttons are provided in the remote controller in the form of a mobile phone keypad, the users who are not accustomed to the mobile phone keypad may have difficulty in inputting characters. When the mouse pointer is used to select a character on the keyboard displayed on the TV screen, it is difficult for a user to rapidly select a character from the keyboard displayed on the TV screen, which causes inefficiency. In the structure in which a pen-shaped optical mouse is used to convert the locus of a motion on the writing pad into a character, if a pen tip is separated from the writing pad due to inter-stroke movements, it is difficult to calculate the locus of the motion of the pen. In the structure in which a special pad is used to calculate the absolute position of a pen, a special pad is required. In the structure that recognizes the motion of a pen using ultrasonic waves and infrared rays, a distance between the pen and a motion recognizing apparatus is predetermined.

Therefore, a technique capable of providing a mouse pointing function and effectively inputting a character is demanded.

SUMMARY OF THE INVENTION

Aspects of the present invention provide a technique for receiving motions sensed by an optical sensor and an inertial sensor and providing both a pointing function and a character input function.

Aspects of the present invention also provide a technique for comparing the motion sensed by an optical sensor with the motion sensed by an inertial sensor and compensating for the drift of an offset that occurs in the inertial sensor.

However, aspects of the present invention are not restricted to the one set forth herein. The above and other aspects of the present invention will become more apparent to one of daily skill in the art to which the present invention pertains by referencing a detailed description of the present invention given below.

According to an aspect of the invention, there is provided an apparatus for recognizing a motion, the apparatus including: an inertial sensor sensing a first motion by using at least one of acceleration and angular velocity that are generated by an input motion; an optical sensor sensing a second motion by using reflection of light due to the motion; a locus calculating unit calculating the locus of the motion on the basis of the locus of the first motion and the locus of the second motion; and a communication unit transmitting the calculated locus of the motion.

According to another aspect of the invention, there is provided a pointer control apparatus including: a receiving unit receiving at least one of a first motion sensed by an inertial sensor and a second motion sensed by an optical sensor; and a locus calculating unit calculating the locus of the first motion or applying the locus of the second motion to the locus of the first motion to calculate the locus of the first motion whose error is compensated.

According to another aspect of the invention, there is provided a method of recognizing a motion performed by an apparatus, the method including: sensing a first motion using at least one of acceleration and angular velocity that are generated by an input motion; sensing a second motion using reflection of light due to the motion; calculating the locus of the motion on the basis of the locus of the first motion and the locus of the second motion; and transmitting the calculated locus of the motion.

According to another aspect of the invention, there is provided a pointer control method including: receiving at least one of a first motion sensed by an inertial sensor and a second motion sensed by an optical sensor; and calculating the locus of the first motion, or applying the locus of the second motion to the locus of the first motion to calculate the locus of the first motion whose error is compensated.

BRIEF DESCRIPTION OF THE DRAWINGS

The above and other features and advantages of the present invention will become more apparent by describing in detail preferred embodiments thereof with reference to the attached drawings in which.

DESCRIPTION OF THE PREFERRED EMBODIMENTS

Figure 1:
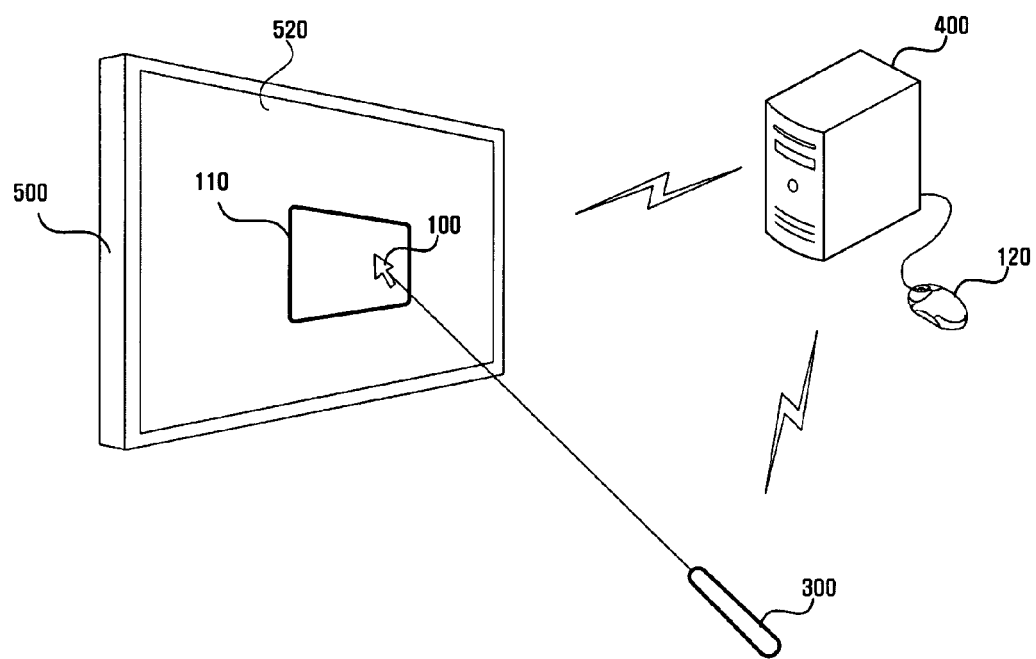
FIG. 1 is a diagram illustrating a motion recognizing system according to an embodiment of the invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Like reference numerals in the drawings denote like elements, and thus their description will be omitted.

FIG. 1 is a diagram illustrating a system for recognizing a motion according to an embodiment of the invention. The system for recognizing a motion includes an apparatus for recognizing a motion (hereinafter, referred to as a motion recognizing apparatus) 300, a pointer control apparatus 400, and a display apparatus 500.

The pointer control apparatus 400 generates a graphic object 110 and a mouse pointer 100, and changes the coordinates of the mouse pointer 100 in response to a control signal received from the motion recognizing apparatus 300.

For example, a personal computer provided with a CPU (central processing unit) may be used as the pointer control apparatus 400. A user uses a mouse 120 connected to the pointer control apparatus 400 to control the motion of the mouse pointer 100, and uses buttons provided in the mouse 120 to perform a drag-and-drop operation to control the motion of the graphic object 110.

The user uses the motion recognizing apparatus 300 to point to a predetermined point on a display device 520 provided in the display apparatus 500. In this case, the motion recognizing apparatus 300 transmits control signals for controlling the motion of the pointer 100 to the pointer control apparatus 400 by wireless or wire communication. That is, when the user inputs a motion to the motion recognizing apparatus 300, a motion sensor provided in the motion recognizing apparatus 300 senses the motion, and signals including information on the sensed motion are transmitted to the pointer control apparatus 400. The information on the motion may be a sensed motion or the locus of the sensed motion.

When the button provided in the motion recognizing apparatus 300 is pushed to transmit a control signal to the pointer control apparatus 400, the pointer control apparatus 400 may generate a button down event of the mouse 120 to drag-and-drop the graphic object 110.

Figure 2:
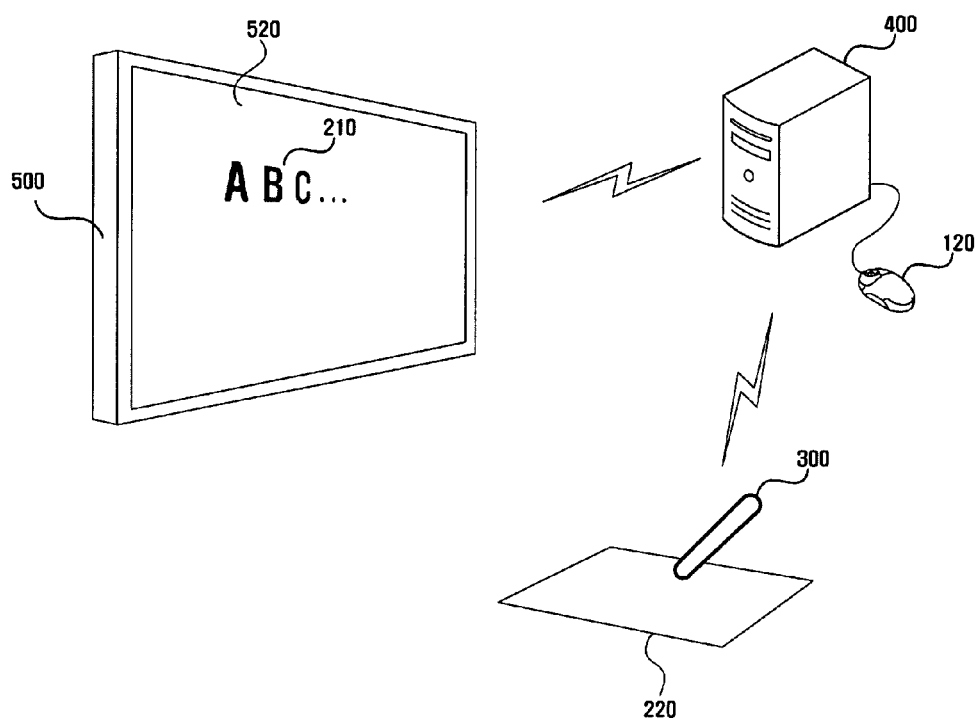
FIG. 2 is a diagram illustrating a motion recognizing system according to another embodiment of the invention.

FIG. 2 is a diagram illustrating a system for recognizing a motion according to another embodiment of the invention. FIG. 2 shows a process of displaying a character corresponding to the motion sensed by the motion recognizing apparatus 300 on the display device 520.

When the user inputs a motion with the motion recognizing apparatus 300 contacting an external object surface 220, a sensed motion is converted into a character and then displayed on the display device 520. In this case, the motion recognizing apparatus 300 or the pointer control apparatus 400 may convert a motion into a character.

In order to sense a motion to be converted into a character, the motion recognizing apparatus 300 may include an optical sensor and an inertial sensor. As shown in FIG. 1, the inertial sensor may be used to receive a motion for controlling the motion of the mouse pointer 100.

The optical sensor may be used to receive a motion for character conversion using light reflected from the external object surface 220.

Meanwhile, the optical sensor can sense the motion of the motion recognizing apparatus 300 while in contact with the external object surface 220, but cannot effectively sense the motion of the motion recognizing apparatus 300 or cannot sense any motion of the motion recognizing apparatus 300 while separated from the external object surface 220.

Therefore, it is preferable that the optical sensor sense a motion while separated from the external object surface 220 and the sensed motion be converted into a character. In this embodiment, the inertial sensor senses a motion with the optical sensor being separated from the external object surface 220.

Meanwhile, an error caused by the drift of an offset may occur in the inertial sensor. The motion sensed by the inertial sensor having the error may not be correctly converted into a character.

Therefore, in this embodiment, the motion recognizing apparatus 300 compares the motion sensed by the optical sensor with the motion sensed by the inertial sensor, while the optical sensor is in contact with the external object surface 220, to estimate an error caused by the drift of an offset, and reflects the estimated error to the motion sensed by the inertial sensor while the optical sensor is separated from the external object surface 220, thereby compensating for errors.

Figure 3:
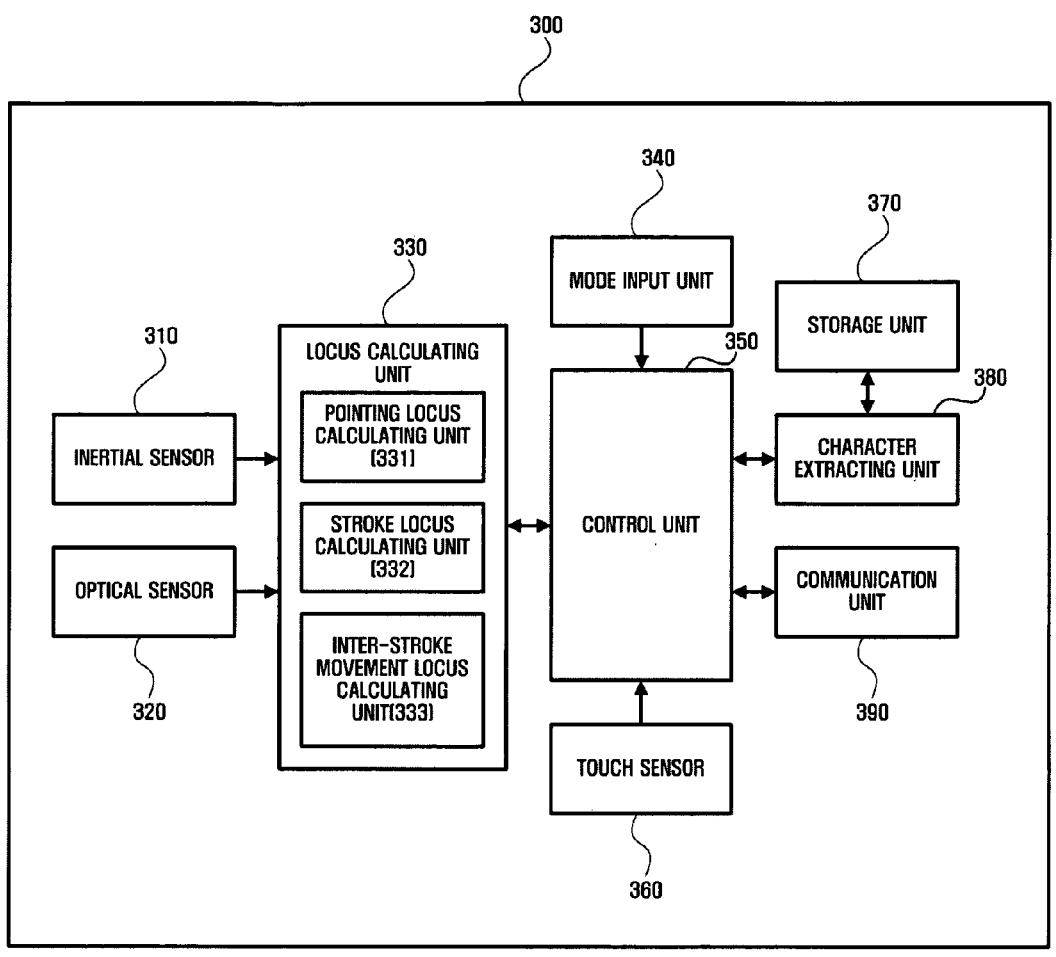
FIG. 3 is a block diagram illustrating a motion recognizing apparatus according to the embodiment of the invention.

FIG. 3 is a block diagram illustrating a motion recognizing apparatus according to an embodiment of the invention. As shown in FIG. 3, the motion recognizing apparatus 300 includes an inertial sensor 310, an optical sensor 320, a locus calculating unit 330, a mode input unit 340, a control unit 350, a touch sensor 360, a storage unit 370, a character extracting unit 380, and a communication unit 390.

The inertial sensor 310 displays the inertial force of a mass that is generated by acceleration or angular velocity as the deformation of an elastic structure connected to the mass, and displays the deformation of the structure as electric signals using an appropriate sensing method and an appropriate signal processing method. In this embodiment, the inertial sensor 310 senses the motion of the motion recognizing apparatus 300.

That is, the inertial sensor 310 uses at least one of the acceleration and the angular velocity that are generated by the actual motion of the motion recognizing apparatus 300 to sense the estimated motion (hereinafter, referred to as a first motion) of the motion recognizing apparatus on the basis of the actual motion.

The inertial sensor 310 may sense a three-dimensional motion composed of a linear motion and a curvilinear motion, as well as a two-dimensional motion, such as a linear or curvilinear motion. That is, the inertial sensor 310 generates a series of electric signals from a two-dimensional or three-dimensional basic motion. The user may combine a plurality of basic motions to generate a desired motion.

The optical sensor 320 uses the reflection of light to sense the motion of the motion recognizing apparatus 300. For example, an optical mouse includes an LED (light emitting diode) for obliquely emitting light to the floor and a CCD (charge coupled device) or a CIS (CMOS image sensor), which is an optical sensor array 320 for sensing a shadow that is generated on the floor due to the emission of light. However, when the optical mouse is separated from the floor, the optical sensor 320 is out of focus, which makes it difficult to sense a motion. Hereinafter, the motion sensed by the optical sensor 320 is referred to as a second motion.

The locus calculating unit 330 calculates the locus of a motion input to the motion recognizing apparatus 300 on the basis of the locus of the first motion and the locus of the second motion. In order to calculate the locus, the locus calculating unit 330 includes a pointing locus calculating unit 331, a stroke locus calculating unit 332, and an inter-stroke movement locus calculating unit 333.

The pointing locus calculating unit 331 calculates the locus of the first motion sensed by the inertial sensor 310. The locus of the first motion calculated by the pointing locus calculating unit 331 (hereinafter, referred to as a pointing locus) is transmitted through the communication unit 390 and is used to control the motion of the mouse pointer 100.

The stroke locus calculating unit 332 calculates the locus of the second motion sensed by the optical sensor 320 while the optical sensor 320 is in contact with the external object surface (hereinafter, referred to as a second contact locus). In order to check whether the optical sensor contacts with the external object surface, the motion recognizing apparatus 300 may include the touch sensor 360. The stroke locus calculating unit 332 calculates the locus of the first motion sensed by the inertial sensor 310 while the optical sensor is in contact with the external object surface (hereinafter, referred to as a first contact locus).

The contact result sensed by the touch sensor 360 is transmitted to the control unit 350, and the stroke locus calculating unit 332 calculates the second contact locus according to a control command from the control unit 350.

The inter-stroke movement locus calculating unit 333 calculates the locus of the motion of the motion recognizing apparatus 300 while the motion recognizing apparatus 300 is separated from the external object surface. When the contact result sensed by the touch sensor 360 is transmitted to the control unit 350, the inter-stroke movement locus calculating unit 333 calculates the locus of the motion (hereinafter, referred to as a separation locus) while the motion recognizing apparatus 300 is separated from the external object surface, according to a control command from the control unit 350.

In this case, at least one of the first motion and the second motion may be used to calculate the separation locus. Since the second motion is likely to be accurately sensed by the optical sensor 320 in the separated state, it is preferable to use the first motion sensed by the inertial sensor 310. In the following description, the separation locus means the locus of the motion sensed by the inertial sensor 310, with the motion recognizing apparatus 300 being separated from the external object surface.

Meanwhile, as described above, it is assumed that an error caused by the drift of an offset exists in the inertial sensor 310 at all the time. In this case, the scale of the second contact locus calculated in the contact state may be different from the scale of the separation locus calculated in the separated state.

In this embodiment, the inter-stroke movement locus calculating unit 333 may calculate an error-compensated separation locus on the basis of the first contact locus and the second contact locus. That is, the inter-stroke movement locus calculating unit 333 uses the first contact locus and the second contact locus to estimate an error caused by the drift of an offset, and applies the estimated error to the separation locus. Specifically, the inter-stroke movement locus calculating unit 333 applies the difference between the first contact locus and the second contact locus to the separation locus to calculate a separation locus in which the error generated by the inertial sensor 310 is compensated.

That is, the locus of an input motion includes the separation locus and the second contact locus.

The mode input unit 340 receives the mode of the motion recognizing apparatus 300. The motion recognizing apparatus 300 may be used as a pointing apparatus or a character recognizing apparatus. In this case, the mode input unit 340 receives a mode selection command. When the mode input unit 340 receives a pointing mode selection command, the pointing locus calculating unit 331 calculates the locus (pointing locus) of the first motion sensed by the inertial sensor 310, and the communication unit 390 transmits information on the locus, thereby controlling the motion of the mouse pointer 100.

When the mode input unit 340 receives a character recognizing mode selection command, the locus calculating unit 330 calculates the second contact locus and an error-compensated separation locus on the basis of the first motion and the second motion respectively received from the inertial sensor 310 and optical sensor 320, and the communication unit 390 transmits information of the loci. Then, the display apparatus 500 displays a character.

Meanwhile, the motion recognizing apparatus 300 may include the character extracting unit 380 and the storage unit 370. In this case, when receiving a combination of the error-compensated separation locus and the second contact locus calculated by the locus calculating unit 330, the character extracting unit 380 may extract a character corresponding to the received combination of the error-compensated separation locus and the second contact locus from the storage unit 370. The communication unit 390 transmits the character, not the locus of the motion.

The storage unit 370 is a module capable of input/output information, such as a hard disk, a flash memory, a CF (compact flash) card, an SD (secure digital) card, an SM (smart media) card, an MMC (multimedia card) or a memory stick, and it may be provided in the motion recognizing apparatus 300 or a separate apparatus. When the storage unit 370 is provided in a separate apparatus, the communication unit 390 may communicate with the separate apparatus to transmit the locus of a motion or receive a character corresponding to the locus.

The control unit 350 controls the operations of the inertial sensor 310, the optical sensor 320, the locus calculating unit 330, the mode input unit 340, the touch sensor 360, the storage unit 370, the character extracting unit 380, the communication unit 390, and the motion recognizing apparatus 300.

Figure 4:
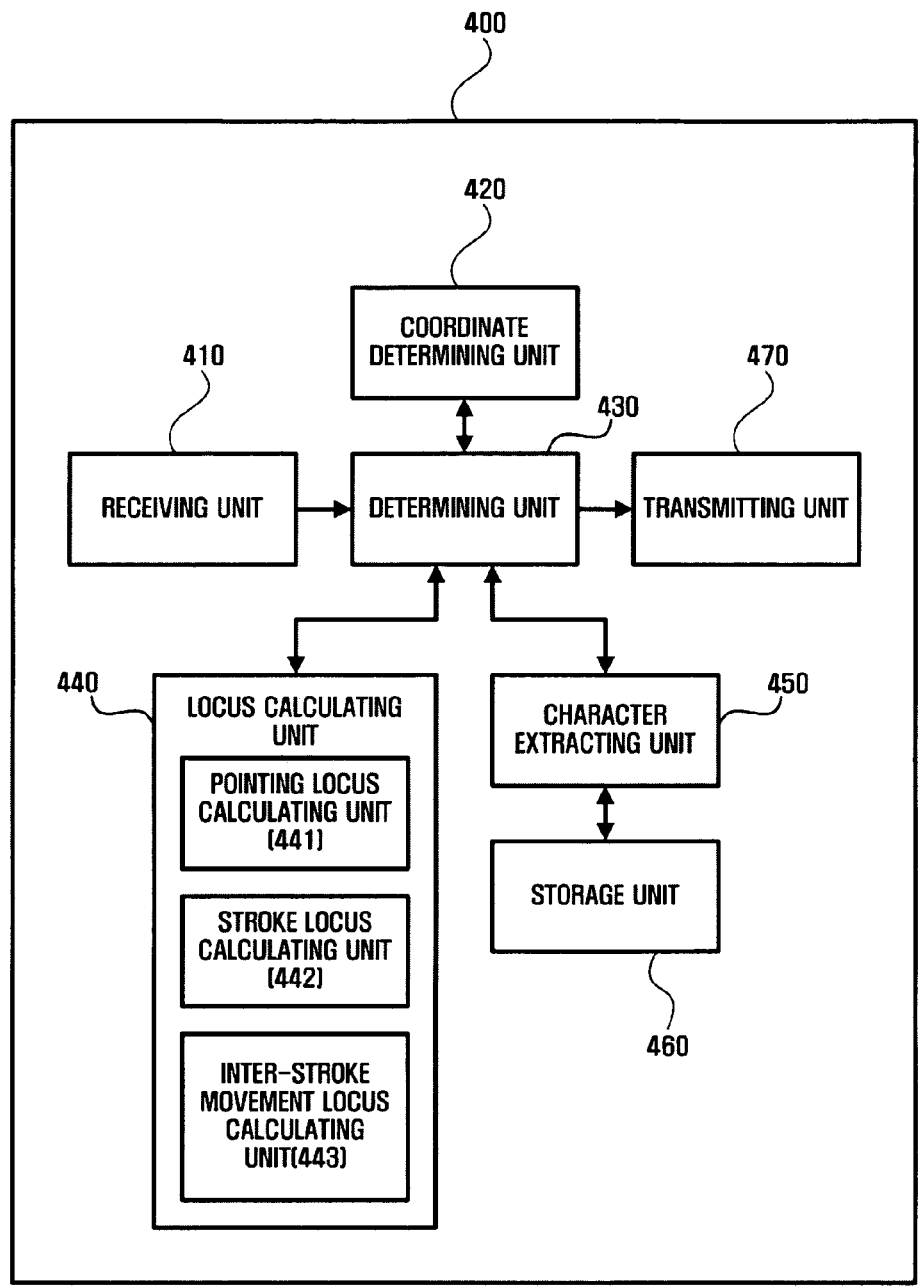
FIG. 4 is a block diagram illustrating a pointer control apparatus according to the embodiment of the invention.

FIG. 4 is a block diagram illustrating the structure of the pointer control apparatus according to the embodiment of the invention. As shown in FIG. 4, the pointer control apparatus 400 includes a receiving unit 410, a coordinate determining unit 420, a determining unit 430, a locus calculating unit 440, a character extracting unit 450, a storage unit 460, and a transmitting unit 470.

As described with reference to FIGS. 1 and 2, the pointer control apparatus 400 receives information on a motion (hereinafter, referred to as motion information) from the motion recognizing apparatus 300, and determines the coordinates of the pointer 100 or performs character conversion.

In order to determine the coordinates of the pointer or perform character conversion, the receiving unit 410 of the pointer control apparatus 400 receives motion information from the motion recognizing apparatus 300.

The received motion information is transmitted to the determining unit 430, and the determining unit 430 determines the type of motion information. The motion information includes a motion for controlling the pointer or the locus of the motion, a motion for character conversion or the locus of the motion, and a character.

That is, when the received motion information is the locus of a motion for controlling the pointer, the motion information is transmitted to the coordinate determining unit 420. When the received motion information is the locus of a motion for character conversion, the motion information is transmitted to the character extracting unit 450. When the received motion information is a character, the motion information is directly transmitted through the transmitting unit 470.

The coordinate determining unit 420 determines the coordinates of the pointer 100 displayed on a display region of the display apparatus 500. That is, the coordinate determining unit 420 applies displacement corresponding to the received motion information to the current position of the pointer 100 to calculate the absolute coordinates of the pointer 100.

The pointer 100 is mapped to the display region according to the determined coordinates of the pointer 100, and an image signal for the displayed pointer is transmitted to the display apparatus 500 through the transmitting unit 470.

Meanwhile, when the pointer control apparatus 400 is provided with a display device (not shown), the pointer 100 may be displayed on a display region of the display device of the pointer control apparatus 400 according to the coordinates of the pointer 100 determined by the coordinate determining unit 420.

Data communication may be performed between the transmitting unit 390 of the motion recognizing apparatus 300 and the receiving unit 410 of the pointer control apparatus 400 by wire communication methods, such as Ethernet, USB, IEEE 1394, serial communication, and parallel communication, or wireless communication methods, such as infrared communication, Bluetooth, Home RF, and wireless LAN.

When the receiving unit 410 receives a motion (a motion for controlling the pointer or a motion for character conversion), not the locus of a motion, from the motion recognizing apparatus 300, the received motion is transmitted to the locus calculating unit 440. The motion includes the first motion sensed by the inertial sensor 310 and the second motion sensed by the optical sensor 320.

The pointing locus calculating unit 441 of the locus calculating unit 440 calculates a pointing locus, and the stroke locus calculating unit 442 calculates the locus of a motion (a first contact locus and a second contact locus) while the motion recognizing apparatus 300 is in contact with the external object surface, among the motions sensed by the inertial sensor 310 and the optical sensor 320. The inter-stroke movement locus calculating unit 443 calculates the locus of a motion (a separation motion) while the motion recognizing apparatus 300 is separated from the external object surface.

The inter-stroke movement locus calculating unit 443 estimates an error caused by the drift of an offset on the basis of the first contact locus and the second contact locus, and applies the estimated error to the separation locus to calculate an error-compensated separation locus. Since the operation of the locus calculating unit 440 of the pointer control apparatus 400 is similar to the operation of the locus calculating unit 330 of the motion recognizing apparatus 300, a detailed description thereof will be omitted.

When the receiving unit 410 receives a motion, not the locus of a motion, the coordinate determining unit 420 may determine the coordinates of the pointer on the basis of the locus calculated by the locus calculating unit 440.

As shown in FIG. 4, the pointer control apparatus 400 may include the character extracting unit 450 and the storage unit 460. When a locus for character conversion is received from the motion recognizing apparatus 300 or when the locus calculating unit 330 calculates a locus, the determining unit 430 controls the character extracting unit 450 to extract a character corresponding to the locus from the storage unit 460. When a character is received from the motion recognizing apparatus 300, the determining unit 430 may convert the received character into an image, and transmit information on the image to the display apparatus 500 through the transmitting unit 470 such that the display apparatus 500 displays the image.

The pointer control apparatus 400 may include an image generating unit (not shown) for generating the image of a pointer or a character.

Figure 5:
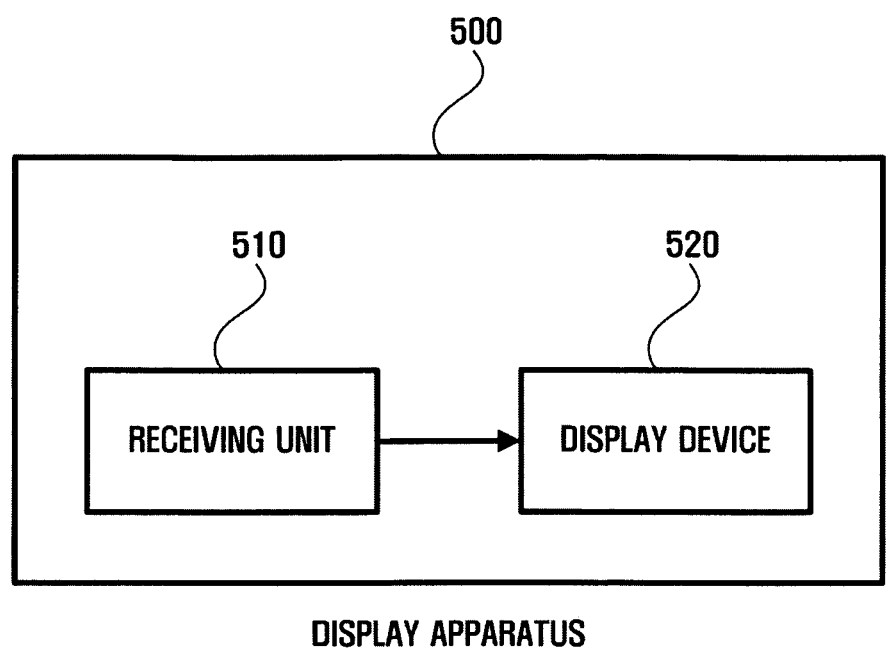
FIG. 5 is a block diagram illustrating a display apparatus according to the embodiment of the invention.

FIG. 5 is a block diagram illustrating the structure of the display apparatus according to the embodiment of the invention. As shown in FIG. 5, the display apparatus 500 includes a receiving unit 510 and the display device 520.

The receiving unit 510 receives the image of a character or the image of a pointer mapped onto the coordinates.

The received image is transmitted to the display device 520, and the display device 520 displays the image. The display device 520 is a module having an image display unit capable of displaying input image signals, such as a CRT (cathode ray tube), an LCD (liquid crystal display), an LED (light-emitting diode), an OLED (organic light-emitting diode), or a PDP (plasma display panel), and displays received image information.

In FIGS. 4 and 5, the pointer control apparatus 400 and the display apparatus 500 are separated from each other, but the invention is not limited thereto. The pointer control apparatus 400 and the display apparatus 500 may be integrated into one apparatus.

Figure 6:
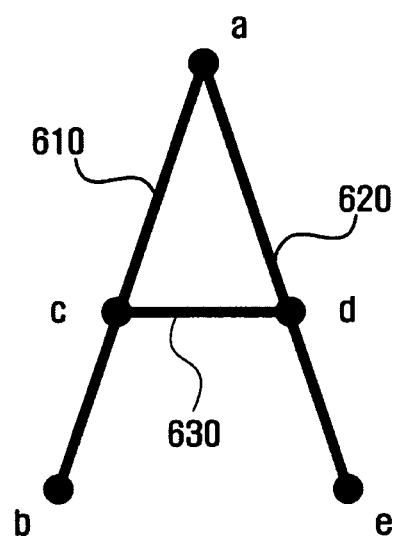
FIG. 6 is a diagram illustrating the locus of a character corresponding to a sensed motion according to the embodiment of the invention.

FIG. 6 is a diagram illustrating the locus of a character corresponding to the sensed motion according to an embodiment of the invention.

The user may move the motion recognizing apparatus 300 to input a character A shown in FIG. 6.

In general, the character A is composed of three straight lines, that is, a straight line 610 linking points a and b, a straight line 630 linking points c and d, and a straight line 620 linking points a and e, as shown in FIG. 6. Meanwhile, after inputting one stroke, the user inputs a motion regardless of the shape of a character, in order to input the next stroke. The strokes correspond to a section linking points b and a and a section linking points e and c in FIG. 6.

A section linking points a and b, a section linking points c and d, and a section linking points a and e are contact sections which correspond to motions sensed by the motion recognizing apparatus 300 while in contact with external object surface. A section linking points b and a and a section linking points e and c correspond to motions sensed by the motion recognizing apparatus 300 while separated from external object surface.

In this embodiment, the locus of the motion sensed by the optical sensor 320 is used as the locus of the motion calculated in the contact section. Meanwhile, since the optical sensor 320 cannot accurately sense a motion in the separation period, the locus of the motion sensed by the inertial sensor 310 is used in the separation section.

Figure 7:
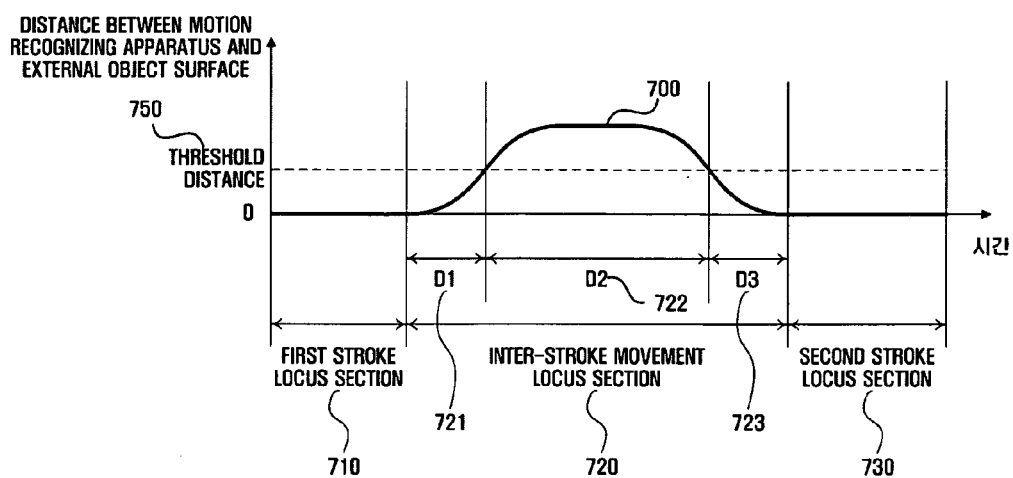
FIG. 7 is a diagram illustrating a stroke locus section and an inter-stroke movement locus section according to the embodiment of the invention.

FIG. 7 is a diagram illustrating stroke locus sections and an inter-stroke movement locus section according to an embodiment of the invention. In FIG. 7, stroke locus sections 710 and 730 are contact sections in which a motion forming a portion of the actual character is input, and an inter-stroke movement locus section 720 is a separation section in which a motion for moving from an end point of one stroke to a start point of another stroke of a character is input.

FIG. 7 shows a graph 700 illustrating a variation in the distance between the motion recognizing apparatus 300 and the external object surface with time, in the stroke locus sections 710 and 730 and the inter-stroke movement locus section 720. In the first stroke locus section 710, the distance between the motion recognizing apparatus 300 and the external object surface is 0. In the inter-stroke movement locus section 720, the distance gradually increases and then gradually decreases. In the second stroke locus section 730, the distance between the motion recognizing apparatus 300 and the external object surface is 0.

In the inter-stroke movement locus section 720, the optical sensor 320 does not sense any motion, but the sensibility of the optical sensor 320 depends on the distance between the motion recognizing apparatus 300 and the external object surface. In a section D2 (722) in which the distance is longer than a threshold distance 750, no motion is sensed. However, in a section D1 (721) and a section D3 (723) in which the distance is shorter than the threshold distance 750, the optical sensor 320 can sense a little motion.

Figure 8:
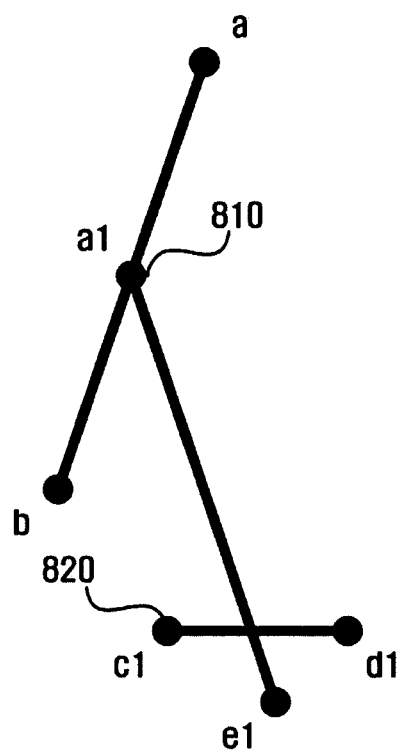
FIG. 8 is a diagram illustrating the locus of a character when an incomplete motion is sensed in the inter-stroke movement locus section.

When an incomplete motion of the optical sensor 320 in the inter-stroke movement locus section 720 is input to form the character shown in FIG. 6, an incomplete character shown in FIG. 8 is formed.

That is, when an incomplete inter-stroke movement from the point b to the point a is performed, a start point of a second stroke is mapped to a point a1 (810), not the point a, and a start point of a third stroke is mapped to a point c1 (820), not the point c.

Figure 9:
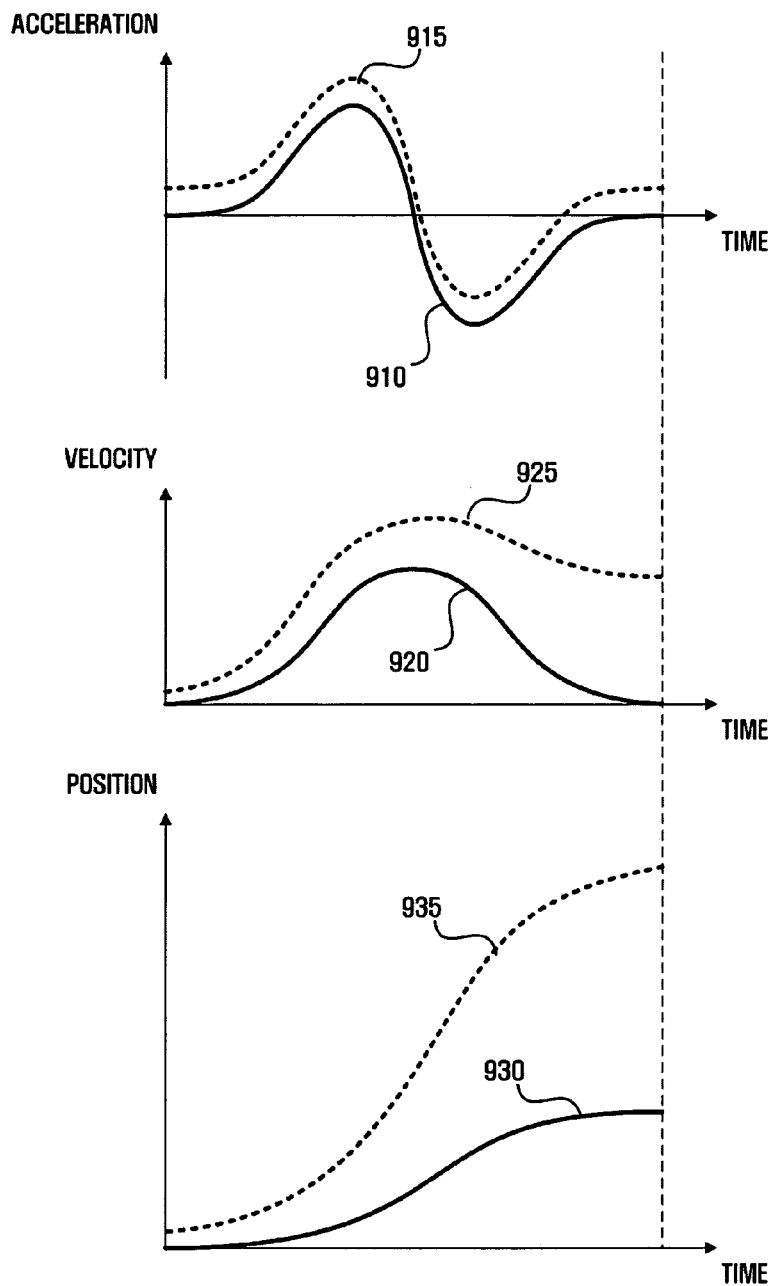
FIG. 9 is a diagram illustrating an error caused by the drift of an offset occurring in an inertial sensor.

Therefore, it is preferable to calculate a locus using the motion sensed by the inertial sensor 310 in the inter-stroke movement locus section 720. As described above, it is considered that an error caused by the drift of an offset exists in the inertial sensor 310. FIG. 9 is a diagram illustrating velocity and position when an error caused by the drift of an offset is included in the motion sensed by an acceleration sensor of the inertial sensor 310.

That is, when a curve 910 is formed as an ideal locus of acceleration corresponding to an input motion, a velocity curve 920 is formed, and a position curve 930 is formed, as shown in FIG. 9.

However, when an acceleration curve including an error caused by the drift of an offset is represented by reference numeral 915, a velocity curve 925 and a position curve 935 are formed.

That is, integration should be performed in order to convert acceleration into velocity and the velocity into position. However, when integration is performed with a very small amount of error included in an initial acceleration curve, there is a great difference between an ideal position curve and the position curve obtained by integration.

Therefore, in order to prevent an error in inter-stroke movement locus, the inter-stroke movement locus calculating unit 333 or 443 compares the locus (second contact locus) of the motion sensed by the optical sensor 320 with the locus (first contact locus) of the motion sensed by the inertial sensor 310 in the stroke locus section 710 before the inter-stroke movement locus section 720, and applies an error caused by the drift of an estimated offset to the locus (separation locus) of the motion sensed by the inertial sensor 310 in the inter-stroke movement locus section 720. In this case, the stroke locus calculating unit 332 or 442 may perform comparison between the locus of the motion sensed by the inertial sensor 310 and the locus of the motion sensed by the optical sensor 320.

Figure 10:
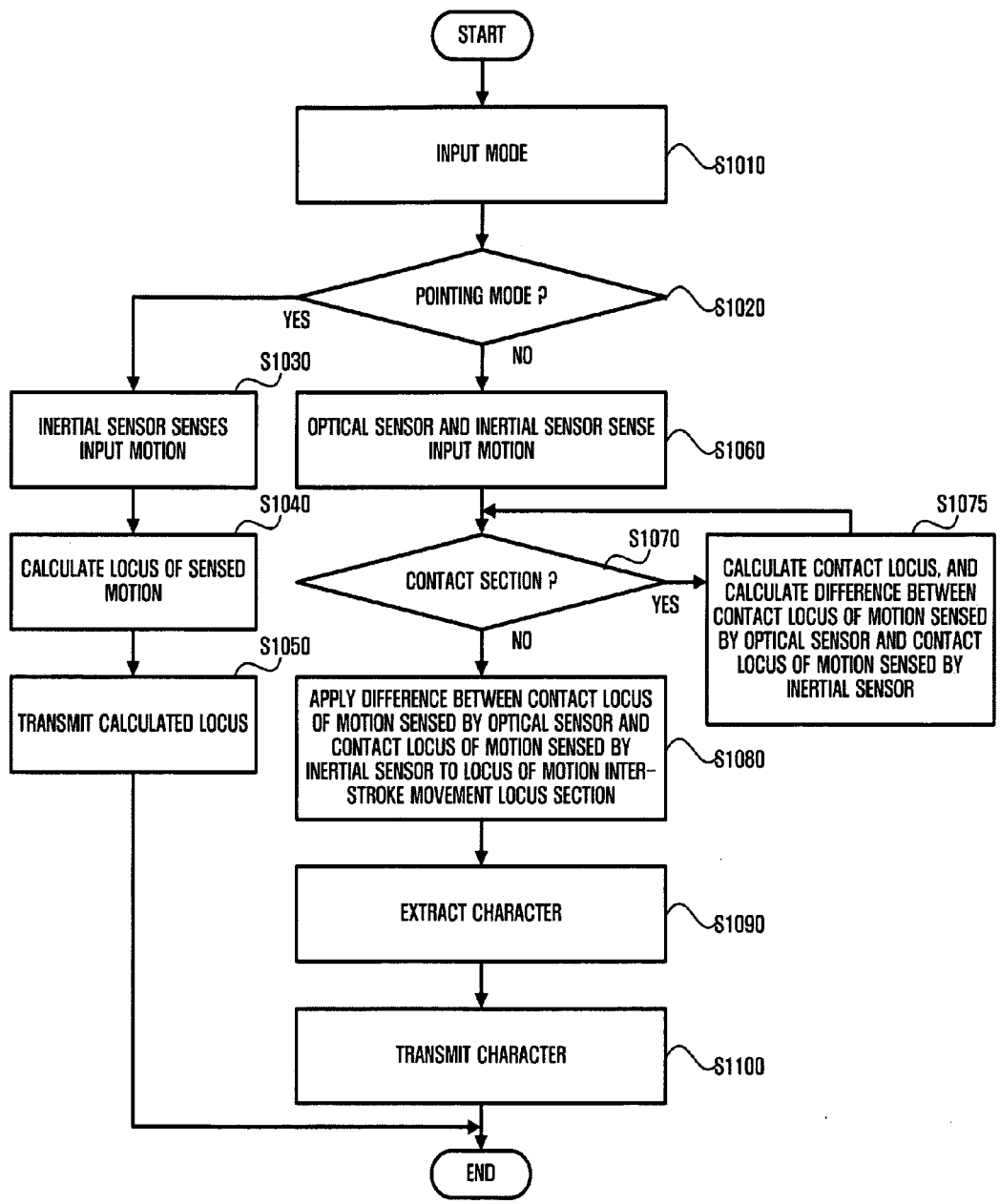
FIG. 10 is a flowchart illustrating a process of recognizing a motion according to an embodiment of the invention.

FIG. 10 is a flowchart illustrating a process of recognizing a motion according to an embodiment of the invention.

In order to recognize a motion, the mode input unit 340 of the motion recognizing apparatus 300 receives a mode (S1010). Then, the control unit 350 determines the input mode (S1020). When a pointing mode is selected, the inertial sensor 310 senses an input motion using at least one of acceleration and an angular velocity that are generated by the motion (S1030).

The motion sensed by the inertial sensor 310 is transmitted to the locus calculating unit 330, and the pointing locus calculating unit 331 of the locus calculating unit 330 calculates the locus of the received motion (S1040). The calculated pointing locus is transmitted to the pointer control apparatus 400 through the communication unit 390 (S1050).

Meanwhile, when a character recognizing mode is selected, the optical sensor 320 and the inertial sensor 310 sense an input motion (S1060).

The touch sensor 360 checks whether the motion recognizing apparatus 300 is in continuous contact with the external object surface, and notifies the control unit 350 of the checked result. The control unit 350 determines whether the motion recognizing apparatus 300 is in continuous contact with the external object surface (S1070). When the touch sensor 360 checks that the motion recognizing apparatus 300 is in the contact section, the stroke locus calculating unit 332 calculates the locus (first contact locus) of the motion sensed by the inertial sensor 310 and the locus (second contact locus) of the motion sensed by the optical sensor 320 in the stroke locus sections 710 and 730, and calculates the difference between the first contact locus and the second contact locus (S1075).

When it is checked that the motion recognizing apparatus 300 is in the separation section, the inter-stroke movement locus calculating unit 333 applies the difference between the first contact locus and the second contact locus to the locus (separation locus) of the motion (first motion) sensed by the inertial sensor 310 in the inter-stroke movement locus section 720 (S1080).

The second contact locus calculated by the locus calculating unit 330 and an error-compensated separation locus are transmitted to the character extracting unit 380, and the character extracting unit 380 extracts a character corresponding to a combination of the received loci from the storage unit 370 (S1090).

Then, the extracted character is transmitted to the pointer control apparatus 400 through the communication unit 390 (S1100), and the pointer control apparatus 400 generates the image of the received character. Then, the display apparatus 500 displays the image.

Meanwhile, the locus calculated by the locus calculating unit 330 may be transmitted to the pointer control apparatus 400, or the motions sensed by the inertial sensor 310 and the optical sensor 320 may be directly transmitted to the pointer control apparatus 400 without being subjected to the locus calculating process.

Figure 11:
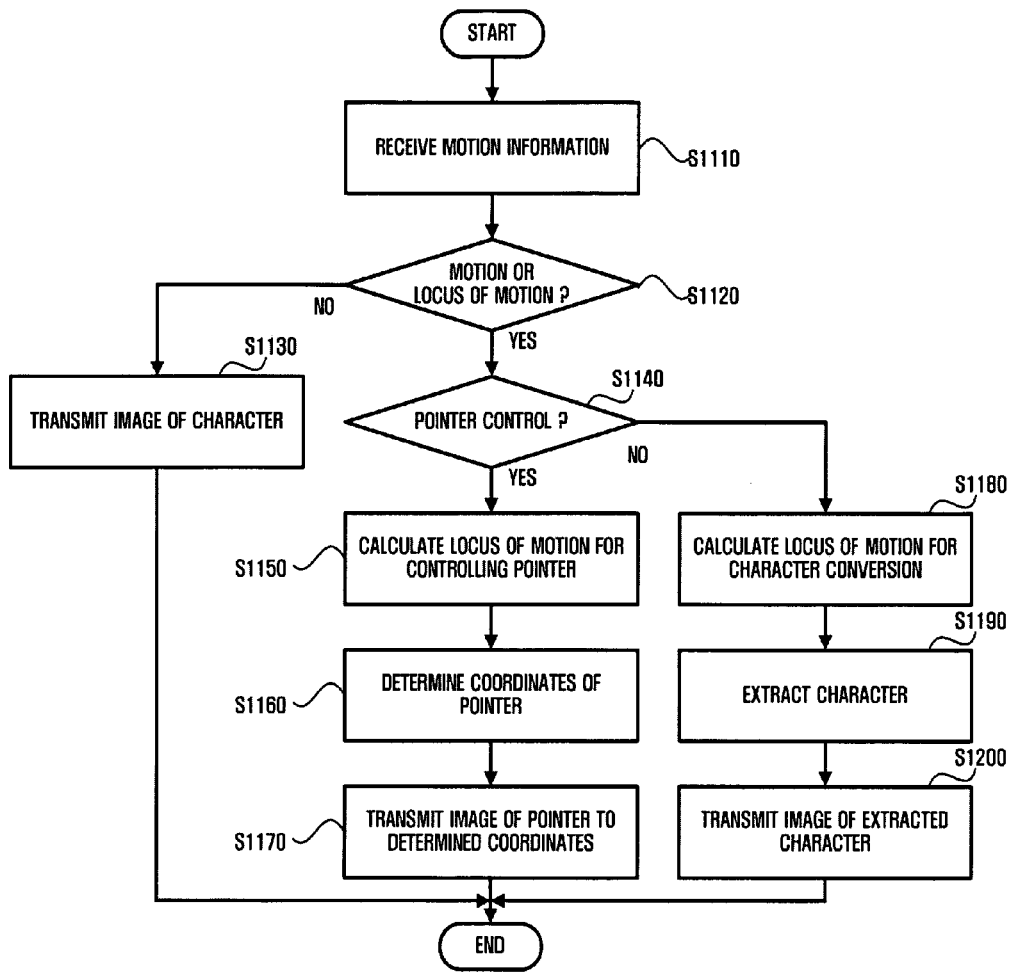
FIG. 11 is a flowchart illustrating a process of controlling a pointer according to an embodiment of the invention.

FIG. 11 is a flowchart illustrating a process of controlling the pointer according to an embodiment of the invention.

In order to control the pointer or output a character, first, the receiving unit 410 of the pointer control apparatus 400 receives motion information from the motion recognizing apparatus 300 (S1110). The motion information may include a motion for controlling the pointer, a motion for character conversion, the locus of the motion for controlling the pointer, the locus of the motion for character conversion, and a character.

The determining unit 430 determines whether a character, a motion, or the locus of a motion is included in the motion information (S1120). That is, the determining unit 430 determines whether the received motion information relates to the motion sensed by the inertial sensor 310 and the optical sensor 320, the locus of the sensed motion, or a character.

When the received motion information relates to a character, the transmitting unit 470 transmits the image of the character to the display apparatus 500 (S1130).

When the received motion information relates to a motion or the locus of a motion, the locus determining unit 430 determines whether the motion or the locus of the motion locus is for controlling the pointer or for character conversion (S1140).

When the received motion information is for controlling the pointer, the locus calculating unit 440 calculates the locus of the motion (S1150). That is, the locus calculating unit 440 calculates a pointing locus. When the motion information includes the locus of the motion, the operation of the locus calculating unit 440 calculating the locus may be omitted.

The locus calculated by the locus calculating unit 440 or the locus of a motion received by the receiving unit 410 is transmitted to the coordinate determining unit 420, and the coordinate determining unit 420 determines the coordinates of the pointer (S1160).

Then, the transmitting unit 470 transmits the image of the pointer corresponding to the determined coordinates to the display apparatus 500 (S1170). When receiving the image of the pointer, the display apparatus 500 displays the pointer at corrected coordinates.

Meanwhile, when the motion information received according to the determination of the determining unit 430 is for character conversion, the locus calculating unit 440 calculates the locus of a motion for character conversion (S1180). That is, the locus calculating unit 440 calculates an error-compensated separation locus on the basis of the first contact locus and the second contact locus. When the motion information includes the locus of a motion, the operation of the locus calculating unit 440 for calculating the locus may be omitted.

The locus calculated by the locus calculating unit 440 or the locus of a motion received by the receiving unit 410 is transmitted to the character extracting unit 450, and the character extracting unit 450 extracts a character corresponding to the received locus from the storage unit 460 (S1190).

Then, the transmitting unit 470 transmits the image of the extracted character to the display apparatus 500 (S1200). When receiving the image of the character, the display apparatus 500 displays the image of the character.

Meanwhile, when the pointer control apparatus 400 is provided with a display device (not shown), the display device may display the image.

The apparatus and method for recognizing a motion according to the embodiments of the invention has the following effects.

First, it is possible to simultaneously perform a pointing function and a character input function since the optical sensor and the inertial sensor sense motions.

Second, it is possible to prevent an error caused by the drift of an offset by comparing the motion sensed by the optical sensor with the motion sensed by the inertial sensor and compensating for the drift of an offset occurring in the inertial sensor.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An input device operable in both a pointing mode and a writing mode, the input device comprising:
   a motion sensor for detecting a first motion of the input device in the pointing mode and in the writing mode;
   an optical sensor for detecting a second motion of the input device in the writing mode by detecting light reflected directly from an external object surface;
   a communication unit for communicating with an external display device; and
   a controller configured to determine coordinate information for the external display device in the writing mode using the detected first motion and the detected second motion, to determine coordinate information for the external display device in the pointing mode using the detected first motion, and to control the communication unit to transmit a coordinating information in the determined mode for the external display device.

2. The input device of claim 1, wherein the motion sensor comprises an inertial sensor sensing the first motion by using at least one of acceleration and angular velocity that are generated by an input motion of the input device,
   wherein the optical sensor senses the second motion by using reflection of light due to the input motion, and
   the input device further comprises a locus calculating unit, in communication with the inertial sensor and the optical sensor, calculating a locus of the input motion on the basis of the locus of the first motion sensed by the inertial sensor and the locus of the second motion sensed by the optical sensor.

3. The input device of claim 2, wherein the locus of the first motion includes a first contact locus of the motion sensed by the inertial sensor while the input device is in contact with an external object surface and a separation locus of the motion sensed by the inertial sensor while the optical sensor is separated from the external object surface, and
   the locus of the second motion includes a second contact locus of the motion sensed by the optical sensor while the optical sensor is in contact with the external object surface.

4. The input device of claim 3, wherein the locus calculating unit applies the difference between the first contact locus and the second contact locus to the separation locus to calculate a separation locus in which an error occurring in the inertial sensor is compensated.

5. The input device of claim 4, wherein the calculated locus of the motion includes the error-compensated separation locus and the second contact locus.

6. The input device of claim 5, further comprising:
a character extracting unit extracting a character corresponding to a combination of the second contact locus and the separation locus.

7. The input device of claim 6, wherein the communication unit transmits the extracted character.

8. The input device of claim 6, wherein the character is determined by a combination of movement of the input device while being in contact with the external object surface and movement of the input device while being in non-contact with the external object surface.

9. The input device of claim 4, wherein the error includes an error caused by a drift of an offset.

10. The input device of claim 2, wherein the communication unit transmits the locus of the first motion.

11. The input device of claim 1, wherein the communication unit transmits the information to change coordinates of a pointer on the display device when the user inputs a motion to the input device.

12. The input device of claim 11, wherein the user combines a plurality of basic motions to generate a desired motion which is a two-dimensional motion or a three-dimensional motion composed of a linear motion and a curvilinear motion.

13. The input device of claim 1, wherein the pointing mode is used to control the external display device.

14. The input device of claim 1, wherein in the writing mode, the input device can be in contact with the external object surface, and
in the pointing mode, the input device is pointed at a point on the external display device.

15. A pointer control apparatus, comprising:
a receiving unit receiving information to change coordinates of a pointer on a display device in a pointing mode of an input device in which light reflected directly from an external object surface is out of an operating range of an optical sensor of the input device, or receiving information to write a character intended by a user in a writing mode on the display screen of the display device; and
a transmitting unit transmitting the changed coordinates of the pointer on the display device or the character according to a mode determined by the input device,
wherein the writing mode is determined by using a detected result of the optical sensor and a detected result of a motion sensor included in the input device, and
wherein the pointing mode is determined by using the detected result of the motion sensor.

16. The pointer control apparatus of claim 15, wherein the receiving unit receives at least one of a first motion sensed by an inertial sensor and a second motion sensed by an optical sensor based upon whether the optical sensor is in physical contact with an external object surface.

17. The pointer control apparatus of claim 16, further comprising:
a locus calculating unit selectively calculating the locus of the first motion and applying the locus of the second motion to the locus of the first motion to compensate for an error to calculate the locus of the first motion whose error is compensated.

18. The pointer control apparatus of claim 17, further comprising:
a coordinate determining unit determining the coordinates of a pointer on the basis of the calculated locus of the first motion.

19. The pointer control apparatus of claim 17, further comprising:
a character extracting unit extracting the character corresponding to a combination of the locus of the second motion and the locus of the first motion whose error is compensated.

20. The pointer control apparatus of claim 17, wherein the error includes an error caused by a drift of an offset.

21. The pointer control apparatus of claim 15, wherein the pointing mode is used to control the display device.

22. The pointer control apparatus of claim 15, wherein in the writing mode, the input device can be in contact with the external object surface, and
in the pointing mode, the input device is pointed at a point on the display device.

23. A method of operating in both a pointing mode and a writing mode by an input device, the method comprising:
detecting a first motion of the input device in the pointing mode and in the writing mode;
detecting a second motion of the input device in the writing mode by detecting light reflected directly from an external object surface;
communicating with an external display device;
determining coordinate information for the external display device in the writing mode using the detected first motion and the detected second motion, and determining coordinate information for the external display device in the pointing mode using the detected first motion; and
transmitting a coordinating information in the determined mode for the external display device.

24. The method of claim 23, wherein detecting the first motion comprises sensing, by an inertial sensor, the first motion by using at least one of acceleration and angular velocity that are generated by an input motion of the input device,
wherein detecting the second motion comprises sensing, by an optical sensor, the second motion by using reflection of light due to the input motion, and
wherein the method further comprises calculating the locus of the input motion on the basis of the locus of the first motion and the locus of the second motion; and
transmitting the calculated locus of the motion.

25. The method of claim 24, wherein the locus of the first motion includes a first contact locus of the motion sensed by the inertial sensor while the input device is in contact with an external object surface and a separation locus of the motion sensed by the inertial sensor while the optical sensor is separated from the external object surface, and
the locus of the second motion includes a second contact locus of the motion sensed by the optical sensor while the optical sensor is in contact with the external object surface.

26. The method of claim 25, wherein the calculating of the locus of the motion comprises:
calculating the difference between the first contact locus and the second contact locus; and
applying the difference to the separation locus to calculate a separation locus in which an error occurring in the inertial sensor is compensated.

27. The method of claim 26, wherein the calculated locus of the motion includes the error-compensated separation locus and the second contact locus.

28. The method of claim 27, further comprising:
extracting a character corresponding to a combination of the second contact locus and the separation locus.

29. The method of claim 28, further comprising:
transmitting the extracted character.

30. The input device of claim 28, wherein the character is determined by a combination of movement of the input device while being in contact with the external object surface and movement of the input device while being in non-contact with the external object surface.

31. The method of claim 26, wherein the error includes an error caused by a drift of an offset.

32. The method of claim 24, further comprising:
transmitting the locus of the first motion.

33. The method of claim 23, wherein the information to change coordinates of a pointer on the display device is transmitted when the user inputs a motion to the input device.

34. The input device of claim 33, wherein the user combines a plurality of basic motions to generate a desired motion which is a two-dimensional motion or a three-dimensional motion composed of a linear motion and a curvilinear motion.

35. The method of claim 23, wherein the pointing mode is used to control the external display device.

36. The method of claim 23, wherein in the writing mode, the input device can be in contact with the external object surface, and
in the pointing mode, the input device is pointed at a point on the external display device.

37. A pointer control method comprising:
receiving information to change coordinates of a pointer on a display device in a pointing mode of an input device in which an external object surface is out of an operating range of an optical sensor of the input device, or receiving information to write a character intended by a user in a writing mode on the display screen of the display device; and
transmitting the changed coordinates of the pointer on the display device or the character according to a mode determined by the input device,
wherein the writing mode is determined by using a detected result of the optical sensor and a detected result of a motion sensor included in the input device, and
wherein the pointing mode is determined by using the detected result of the motion sensor.

38. The pointer control method of claim 37, further comprising:
receiving at least one of a first motion sensed by an inertial sensor and a second motion sensed by an optical sensor based upon whether the optical sensor is in physical contact with an external object surface.

39. The pointer control method of claim 38, further comprising:
calculating the locus of the first motion and applying the locus of the second motion to the locus of the first motion to compensate for an error to calculate the locus of the first motion whose error is compensated.

40. The pointer control method of claim 39, further comprising:
determining the coordinates of a pointer on the basis of the calculated locus of the first motion.

41. The pointer control method of claim 39, further comprising:
extracting the character corresponding to a combination of the locus of the second motion and the locus of the first motion whose error is compensated.

42. The pointer control method of claim 39, wherein the error includes an error caused by a drift of an offset.

43. The pointer control method of claim 37, wherein the pointing mode is used to control the display device.

44. The pointer control method of claim 37, wherein in the writing mode, the input device can be in contact with the external object surface, and
in the pointing mode, the input device is pointed at a point on the display device.

* * * * *